US012577421B2

(12) United States Patent
Misawa et al.

(10) Patent No.: US 12,577,421 B2
(45) **Date of Patent: *Mar. 17, 2026**

(54) INKJET INK, INK SET, INK MEDIUM SET, AND PRINTING MEDIUM

(71) Applicant: Nippon Kayaku Kabushiki Kaisha, Tokyo (JP)

(72) Inventors: Shunta Misawa, Tokyo (JP); Keishiro Yoshida, Tokyo (JP)

(73) Assignee: Nippon Kayaku Kabushiki Kaisha, Tokyo (JP)

(*) Notice: Subject to any disclaimer, the term of this patent is extended or adjusted under 35 U.S.C. 154(b) by 286 days.

This patent is subject to a terminal disclaimer.

(21) Appl. No.: 18/552,563

(22) PCT Filed: Mar. 30, 2022

(86) PCT No.: PCT/JP2022/016358

§ 371 (c)(1),
(2) Date: Sep. 26, 2023

(87) PCT Pub. No.: WO2022/224787

PCT Pub. Date: Oct. 27, 2022

(65) Prior Publication Data

US 2024/0182733 A1 Jun. 6, 2024

(30) Foreign Application Priority Data

Apr. 19, 2021 (JP) ................................ 2021-070177

(51) Int. Cl.

| | |
|---|---|
| ***C09D 11/322*** | (2014.01) |
| ***B41J 2/01*** | (2006.01) |
| ***B41J 2/21*** | (2006.01) |
| ***C09D 11/328*** | (2014.01) |
| ***C09D 11/38*** | (2014.01) |
| ***C09D 11/40*** | (2014.01) |
| ***C09D 11/54*** | (2014.01) |

(52) U.S. Cl.
CPC ............... *C09D 11/322* (2013.01); *B41J 2/01* (2013.01); *B41J 2/2107* (2013.01); *C09D 11/328* (2013.01); *C09D 11/38* (2013.01); *C09D 11/40* (2013.01); *C09D 11/54* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 2/18; B41J 25/312; B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; C09D 11/108; B41M 5/0011; B41M 5/0017; B41M 5/0023; B41M 5/0047; B41M 7/00; B41M 7/0072; B41M 5/52; B41M 5/5218; B41M 5/5227
See application file for complete search history.

(56) References Cited

U.S. PATENT DOCUMENTS

| | | | | |
|---|---|---|---|---|
| 7,686,876 B2 | 3/2010 | Koganehra et al. | | |
| 2003/0019398 A1 | 1/2003 | Komatsu et al. | | |
| 2009/0176071 A1 | 7/2009 | Koganehra et al. | | |
| 2009/0181219 A1* | 7/2009 | Saito | .................... | C09D 11/322 524/588 |
| 2009/0196995 A1* | 8/2009 | Saito | .................... | C09D 11/322 427/256 |
| 2009/0308279 A1 | 12/2009 | Koganehra et al. | | |
| 2010/0080962 A1 | 4/2010 | Koganehra et al. | | |
| 2010/0289848 A1 | 11/2010 | Koganehra et al. | | |
| 2011/0143270 A1* | 6/2011 | Seto | .................... | C09D 11/322 430/7 |

(Continued)

FOREIGN PATENT DOCUMENTS

| | | |
|---|---|---|
| CN | 102732092 A | 3/2015 |
| CN | 110461957 A | 3/2018 |

(Continued)

OTHER PUBLICATIONS

Notice of Reasons for Rejection issued in Japanese Patent Application No. 2022-562125, mailed Dec. 6, 2022.

(Continued)

*Primary Examiner* — Manish S Shah
(74) *Attorney, Agent, or Firm* — Knobbe, Martens, Olson & Bear, LLP

(57) ABSTRACT

An inkjet ink which contains a pigment, a water-soluble organic solvent, and an organic compound (but excluding the pigment and the water-soluble organic solvent), and in which the log P value of the water-soluble organic solvent is less than 1.258, the interface tension of the organic compound with respect to OPP is less than 20.7 mN/m, the value of (B)/(A) is 0.01-0.50 where (A) represents the total mass of the water-soluble organic solvent in the ink, and (B) represents the total mass of the organic compound, and the surface tension is less than 33.7 mN/m at 25° C.

10 Claims, No Drawings

(56) References Cited

U.S. PATENT DOCUMENTS

| | | | | |
|---|---|---|---|---|
| 2011/0230603 | A1* | 9/2011 | Yoda | C09D 11/322 524/95 |
| 2012/0262517 | A1 | 10/2012 | Takaku et al. | |
| 2013/0079447 | A1* | 3/2013 | Koike | C09D 11/106 524/377 |
| 2014/0066550 | A1* | 3/2014 | Shigemori | C09D 11/322 524/190 |
| 2017/0183522 | A1* | 6/2017 | Chaffins, Jr. | B41J 2/01 |
| 2019/0077978 | A1* | 3/2019 | Suzuki | C09D 11/322 |
| 2019/0077981 | A1 | 3/2019 | Uotome et al. | |
| 2019/0330486 | A1* | 10/2019 | Sugihara | C09D 11/322 |
| 2020/0017703 | A1* | 1/2020 | Ozawa | C09D 11/322 |
| 2020/0018878 | A1* | 1/2020 | Chuko | C09D 5/32 |
| 2020/0048486 | A1* | 2/2020 | Nio | B41J 2/01 |
| 2020/0199387 | A1* | 6/2020 | Utsugi | B41J 2/01 |
| 2020/0262228 | A1 | 8/2020 | Hagiwara et al. | |
| 2021/0238431 | A1 | 8/2021 | Yoda et al. | |
| 2021/0363367 | A1 | 11/2021 | Hanazato et al. | |
| 2021/0403741 | A1* | 12/2021 | Ozawa | B41J 2/2107 |
| 2022/0041877 | A1 | 2/2022 | Sato et al. | |
| 2022/0073772 | A1* | 3/2022 | Yoda | C09D 11/322 |

FOREIGN PATENT DOCUMENTS

| | | | |
|---|---|---|---|
| CN | 111886301 | A | 1/2023 |
| EP | 1375607 | A1 | 1/2004 |
| EP | 3228668 | A1 | 10/2017 |
| EP | 3733790 | A1 | 11/2020 |
| EP | 4328034 | A1 | 2/2024 |
| JP | H08-209046 | A | 8/1996 |
| JP | H 11-124524 | A | 5/1999 |
| JP | H 11-181341 | A | 7/1999 |
| JP | 2001-049159 | A | 2/2001 |
| JP | 2004-098403 | A | 4/2004 |
| JP | 2004-306441 | A | 11/2004 |
| JP | 2008-069355 | A | 3/2008 |
| JP | 2012-136573 | A | 7/2012 |
| JP | 2013-018164 | A | 1/2013 |
| JP | 2013-107224 | A | 6/2013 |
| JP | 5504890 | B2 | 5/2014 |
| JP | 2015-110793 | A | 6/2015 |
| JP | 2017-155186 | A | 9/2017 |
| JP | 2018-154118 | A | 10/2018 |
| JP | 2019-018469 | A | 2/2019 |
| JP | 2019-019160 | A | 2/2019 |
| JP | 2019-210452 | A | 12/2019 |
| JP | 2019-214717 | A | 12/2019 |
| JP | 2020-006676 | A | 1/2020 |
| JP | 2020-055943 | A | 4/2020 |
| JP | 2020-125382 | A | 8/2020 |
| JP | 2020-125452 | A | 8/2020 |
| JP | 2020-131529 | A | 8/2020 |
| JP | 6754882 | B1 | 9/2020 |
| WO | WO 2002/066564 | A1 | 8/2002 |
| WO | WO 2014/122945 | A1 | 8/2014 |
| WO | WO 2014/156758 | A1 | 10/2014 |
| WO | WO 2017/154683 | A1 | 9/2017 |

OTHER PUBLICATIONS

Office Action issued in Chinese Patent Application No. 202280027937.0, dated Feb. 21, 2025, in 12 pages.

Extended Search Report issued in European Patent Application No. 22791562.6, dated Mar. 19, 2025, in 7 pages.

Extended Search Report issued in European Patent Application No. 22791563.4, dated Mar. 21, 2025.

Notification of Reasons for Refusal issued in Japanese Patent Application No. 2022-555890, dated Nov. 22, 2022.

Office Action issued in Chinese Patent Application No. 202280027937.0, dated Sep. 19, 2025.

Office Action issued in Chinese Patent Application No. 202280028139.X, dated Feb. 22, 2025.

Office Action issued in Chinese Patent Application No. 202280028139.X, dated Sep. 18, 2025.

* cited by examiner

INKJET INK, INK SET, INK MEDIUM SET, AND PRINTING MEDIUM

This application is the U.S. National Phase under 35 U.S.C. § 371 of International Application PCT/JP2022/016358, filed Mar. 30, 2022, designating the U.S., and published in Japanese as WO 2022/224787 on Oct. 27, 2022, which claims priority to Japanese Patent Application No. 2021-070177, filed Apr. 19, 2021, the entire content of which are incorporated herein by reference.

TECHNICAL FIELD

The present invention relates to an inkjet ink, an ink set, an ink and medium set, and a printed medium.

BACKGROUND ART

A printing method with an inkjet printer (inkjet printing method), which is one of the most representative color printing methods, involves generating small droplets of ink and adhering them to a printing medium such as paper to perform recording. In recent years, advances have been made in the inkjet printing method for industrial applications, and there is a growing demand for methods that support various printing media.

Among the printing media used for industrial applications, there is also a non-ink-absorbent medium represented by a film. In order to print on such a non-ink-absorbent medium, a solvent ink using an organic solvent as the main solvent, a curable ink containing a polymerizable monomer, and the like have been developed. However, these inks have many safety issues for the natural environment, living organisms, and the like, and their applications have been limited. Therefore, a growing trend in recent years has been for development of a water-based ink using water as the main solvent (see, for example, Patent Documents 1 to 3).

Conventional inks proposed in Patent Documents 1 to 3, however, show poor wettability to the non-ink-absorbent medium such as a polyethylene terephthalate (PET) film and a polypropylene (PP) film.

CITATION LIST

Patent Document

Patent Document 1: Japanese Patent No. 5504890

Patent Document 2: Japanese Unexamined Patent Application, Publication No. 2020-125382

Patent Document 3: Japanese Unexamined Patent Application, Publication No. 2020-55943

DISCLOSURE OF THE INVENTION

Problems to be Solved by the Invention

An object of the present invention is to provide: an inkjet ink with good wettability to a non-ink-absorbent medium; an ink set including the inkjet ink; an ink and medium set including the inkjet ink or the ink set and a printing medium; and a printed medium to which the inkjet ink or each inkjet ink included in the ink set has adhered.

Means for Solving the Problems

Specific means for achieving the above object includes embodiments described below.

1) An inkjet ink containing a pigment, a water-soluble organic solvent, and an organic compound excluding the pigment and the water-soluble organic solvent, in which the log P value of the water-soluble organic solvent is less than 1.258;

the interface tension of the organic compound with respect to biaxially oriented polypropylene (OPP) is less than 20.7 mN/m, where the interface tension at 25° C. between an OPP film and a mixture of 1 part by mass of the organic compound, 9 parts by mass of 1,4-butanediol, and 90 parts by mass of purified water, as determined by contacting the mixture with the OPP film, is defined as the interface tension of the organic compound with respect to OPP;

the value of (B)/(A) is 0.01 to 0.50, where (A) represents the total mass of the water-soluble organic solvent contained in the inkjet ink, and (B) represents the total mass of the organic compound; and the inkjet ink has a surface tension of less than 33.7 mN/m at 25° C.

2) The inkjet ink according to 1), in which the interface tension of the organic compound with respect to OPP is 19 mN/m or less.

3) The inkjet ink according to 1), in which the interface tension of the organic compound with respect to OPP is 18 mN/m or less.

4) The inkjet ink according to any one of 1) to 3), in which the water-soluble organic solvent contains at least one selected from the group consisting of a compound represented by formula (1) below, a compound represented by formula (2) below, propylene glycol alkyl ether, and diethylene glycol alkyl ether:

$$HO—R^1—OH \qquad (1)$$

in formula (1), $R^1$ represents a linear or branched C4-C6 hydrocarbon group, and (2)

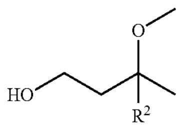

in formula (2), $R^2$ represents a hydrogen atom or a methyl group.

5) The inkjet ink according to 4), in which the water-soluble organic solvent contains at least one selected from the group consisting of 1,5-pentanediol, 1,4-butanediol, 1,6-hexanediol, propylene glycol monopropyl ether, diethylene glycol alkyl ether, and 3-methoxy-1-butanol.

6) The inkjet ink according to any one of 1) to 5), in which the organic compound contains at least one selected from the group consisting of polyoxyalkylene alkyl ether, polyoxyalkylene aryl ether, polyoxyethylene alkyl sulfurate, and an acetylene glycol surfactant.

7) The inkjet ink according to 6), in which the organic compound contains at least one selected from the group consisting of polyoxyethylene naphthyl ether, polyoxyalkylene-2-ethylhexyl ether, polyoxyethylene lauryl sulfurate, and an acetylene glycol surfactant.

8) An ink set including: the inkjet ink according to any one of 1) to 7); and an additional inkjet ink different from the inkjet ink.

9) An ink and medium set including: the inkjet ink according to any one of 1) to 7) or the ink set according to 8); and a printing medium.

10) A printed medium to which the inkjet ink according to any one of 1) to 7) or each inkjet ink included in the ink set according to 8) has adhered.

Effects of the Invention

The present invention can provide: an inkjet ink with good wettability to a non-ink-absorbent medium; an ink set including the inkjet ink; an ink and medium set including the inkjet ink or the ink set and a printing medium; and a printed medium to which the inkjet ink or each inkjet ink included in the ink set has adhered.

Preferred Mode for Carrying Out the Invention

Hereinafter, specific embodiments to which the present invention is applied will be described in detail. As used herein, "C.I." means a "color index". As used herein, the terms "alkylene", "propylene", and "alkyl" are used in a sense that encompasses both linear and branched structures, unless otherwise specified.

<Inkjet Ink>

An inkjet ink (hereinafter, also simply referred to as an "ink") according to the present embodiment contains a pigment, a water-soluble organic solvent, and an organic compound excluding the pigment and the water-soluble organic solvent, in which the log P value of the water-soluble organic solvent is less than 1.258; the interface tension of the organic compound with respect to biaxially oriented polypropylene (OPP) is less than 20.7 mN/m, where the interface tension at 25° C. between an OPP film and a mixture of 1 part by mass of the organic compound, 9 parts by mass of 1,4-butanediol, and 90 parts by mass of purified water, as determined by contacting the mixture with the OPP film, is defined as the interface tension of the organic compound with respect to OPP; the value of (B)/(A) is 0.01 to 0.50, where (A) represents the total mass of the water-soluble organic solvent contained in the ink according to the present embodiment, and (B) represents the total mass of the organic compound; and the surface tension is less than 33.7 mN/m at 25° C.

The surface tension of the ink according to the present embodiment at 25° C. is preferably 25.0 to 33.7 mN/m and more preferably 28.0 to 32.8 mN/m. When the surface tension of the ink is within the above range, the ink tends to have good wettability to a non-ink-absorbent medium.

The ink according to the present embodiment is preferably free of a silicone surfactant. The silicone surfactant refers to a surfactant with a siloxane bond (—Si—O—Si—) in its molecule.

Hereinafter, components contained in the ink according to the present embodiment will be described in detail. Note that each of the components described below may be used alone or in combinations of two or more thereof.

[Pigment]

Examples of the pigment include an inorganic pigment, an organic pigment, an extender pigment, and a hollow particle.

Examples of the inorganic pigment include carbon black, a metal oxide, a metal hydroxide, a metal sulfide, a metal ferrocyanide, and a metal chloride.

When the ink according to the present embodiment is a black ink, and the pigment is an inorganic pigment, the inorganic pigment contained in the black ink is preferably carbon black such as thermal black, acetylene black, oil furnace black, gas furnace black, lamp black, gas black, and channel black. Specific examples of the carbon black include the Raven series, manufactured by Columbia Carbon; the Monarch series, Regal series, and Mogul series, manufactured by Cabot Corporation; the Color Black series, Printex series, Special Black series, and Nerox series, manufactured by Orion Engineered Carbons; and the MA series, MCF series, No. 25, No. 33, No. 40, No. 47, No. 52, No. 900, and No. 2300, manufactured by Mitsubishi Chemical Corporation.

When the ink according to the present embodiment is a white ink, and the pigment is an inorganic pigment, examples of the inorganic pigment contained in the white ink include an oxide, nitride, or oxynitride of a metal such as zinc, silicon, aluminum, titanium, strontium, and zirconium; and an inorganic compound such as glass and silica. Among them, titanium dioxide and zinc oxide are preferred.

Examples of the organic pigment include various pigments such as azo, disazo, phthalocyanine, quinacridone, isoindolinone, dioxazine, perylene, perinone, thioindigo, anthraquinone, and quinophthalone. Among them, a disazo pigment is preferred.

Specific examples of the organic pigment include yellow pigments such as C.I. Pigment Yellow 1, 2, 3, 12, 13, 14, 16, 17, 24, 55, 73, 74, 75, 83, 93, 94, 95, 97, 98, 108, 114, 128, 129, 138, 139, 150, 151, 154, 155, 180, 185, 193, 199, 202, and 213; red pigments such as C.I. Pigment Red 5, 7, 12, 48, 48:1, 57, 88, 112, 122, 123, 146, 149, 150, 166, 168, 177, 178, 179, 184, 185, 202, 206, 207, 254, 255, 257, 260, 264, 269, and 272; blue pigments such as C.I. Pigment Blue 1, 2, 3, 15, 15:1, 15:2, 15:3, 15:4, 15:6, 16, 22, 25, 60, 66, and 80; violet pigments such as C.I. Pigment Violet 19, 23, 29, 37, 38, and 50; orange pigment such as C.I. Pigment Orange 13, 16, 43, 68, 69, 71, and 73; green pigments such as C.I. Pigment Green 7, 36, and 54; and black pigments such as C.I. Pigment Black 1. Among them, C.I. Pigment Blue 15:4 is preferred.

Examples of the extender pigment include silica, calcium carbonate, talc, clay, barium sulfate, and white carbon. The extender pigment is often used in combination with another pigment.

The hollow particle available can be a known hollow particle described in, for example, U.S. Pat. No. 4,880,465, Japanese Patent No. 3562754, Japanese Patent No. 6026234, Japanese Patent No. 5459460, Japanese Unexamined Patent Application, Publication No. 2003-268694, and Japanese Patent No. 4902216, and in particular, is preferably used as a white pigment.

The average particle size of the pigment is preferably 30 to 300 nm and more preferably 50 to 250 nm. The average particle size as used herein refers to an average particle size of particles as measured using laser light scattering.

The content of the pigment with respect to the total mass of the ink according to the present embodiment is preferably 1 to 30% by mass, more preferably 1 to 10% by mass, and even more preferably 2 to 8% by mass.

[Water-soluble Organic Solvent]

The water-soluble organic solvent is not particularly limited as long as the log P value is less than 1.258. The log P value refers to an octanol/water partition coefficient; the higher the numerical value, the higher the hydrophobic property. The log P value can be expressed as a numerical value of "ClogP", which is calculated using, for example, ChemDraw Professional ver. 16.0 manufactured by PerkinElmer, Inc. The log P value of the water-soluble organic solvent is preferably more than −5.420 and less than 1.258.

Examples of the water-soluble organic solvent having a log P value of less than 1.258 include C1-C6 alkanol such as methanol, ethanol, propanol, isopropanol, butanol, isobutanol, secondary butanol, and tertiary butanol; carboxylic acid amide such as N,N-dimethylformamide and N,N-dimethylacetamide; lactam such as 2-pyrrolidone, N-methyl-2-pyrrolidone, and N-methylpyrrolidin-2-one; cyclic urea such as 1,3-dimethylimidazolidin-2-one and 1,3-dimethyl hexahydropyrimid-2-one; ketone, keto-alcohol, or carbonate such as acetone, 2-methyl-2-hydroxypentan-4-one, and ethylene carbonate; cyclic ether such as tetrahydrofuran and dioxane; mono-, oligo-, or polyalkylene glycol or thioglycol having a C2-C6 alkylene unit such as ethylene glycol, diethylene glycol, 1,2-propylene glycol, 1,3-propylene glycol, 1,2-butylene glycol, 1,4-butylene glycol, diethylene glycol, triethylene glycol, tetraethylene glycol, dipropylene glycol, polyethylene glycol (preferably with a molecular weight of 400, 800, 1540, or more), polypropylene glycol, thiodiglycol, and dithiodiglycol; C3-C9 polyol (triol) such as glycerol, diglycerol, hexane-1,2,6-triol, and trimethylolpropane; glycol ether such as mono-, di-, or triethylene glycol alkyl ether, mono-, di-, or tripropylene glycol alkyl ether, ethylene glycol monophenyl ether, diethylene glycol monophenyl ether, triethylene glycol monophenyl ether, ethylene glycol monobenzyl ether, diethylene glycol monobenzyl ether, and triethylene glycol monobenzyl ether; alkanediol such as 2-methyl-2-propyl-1,3-propanediol, 2-ethyl-2-butyl-1,3-propanediol, 2-ethylhexane-1,3-diol, 1,2-pentanediol, 1,2-hexanediol, 1,2-heptanediol, 1,2-octanediol, 1,2-nonanediol, 1,7-heptanediol, 1,8-octanediol, 1,9-nonanediol, and 1,10-decanediol.

The water-soluble organic solvent is preferably a compound represented by formula (1) below, a compound represented by formula (2) below, propylene glycol alkyl ether, and diethylene glycol alkyl ether.

$$HO—R^1—OH \quad (1)$$

(2)

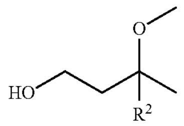

In formula (1), $R^1$ represents a linear or branched C4-C6 hydrocarbon group. The compound represented by formula (1) is preferably 1,4-butanediol, 1,5-pentanediol, and 1,6-hexanediol.

In formula (2), $R^2$ represents a hydrogen atom or a methyl group. The compound represented by formula (2) is preferably 3-methoxy-1-butanol and 3-methoxy-3-methyl-1-butanol.

Examples of the propylene glycol alkyl ether include propylene glycol monoalkyl ether such as propylene glycol monopropyl ether and propylene glycol monobutyl ether; and propylene glycol dialkyl ether such as propylene glycol diethyl ether.

Examples of the diethylene glycol alkyl ether include diethylene glycol monoalkyl ether such as diethylene glycol monobutyl ether, diethylene glycol monoethyl ether, and diethylene glycol monomethyl ether; and diethylene glycol dialkyl ether such as diethylene glycol dimethyl ether and diethylene glycol butylmethyl ether.

In particular, the water-soluble organic solvent preferably contains at least one selected from the group consisting of 1,5-pentanediol, 1,4-butanediol, 1,6-hexanediol, propylene glycol monopropyl ether, diethylene glycol alkyl ether, and 3-methoxy-1-butanol, and more preferably contains at least one selected from the group consisting of 1,5-pentanediol, 1,4-butanediol, propylene glycol monopropyl ether, diethylene glycol butylmethyl ether, and 3-methoxy-1-butanol.

The water-soluble organic solvent above is a compound having a good balance between hydrophilic and hydrophobic properties, and has a property of being soluble in any of water and the organic compound contained in the ink. It is considered that this property makes it possible to stably dissolve the organic compound even in a water-based ink, where water accounts for the majority of the total mass of the ink, thus preventing phase separation of the ink.

The content of the water-soluble organic solvent with respect to the total mass of the ink according to the present embodiment is preferably 1 to 20% by mass, more preferably 1 to 15% by mass, even more preferably 1 to 10% by mass, and particularly preferably 3 to 7% by mass.

[Organic Compound]

The organic compound to be used has an interface tension with respect to OPP of less than 20.7 mN/m. The interface tension of the organic compound with respect to OPP is preferably 19 mN/m or less and more preferably 18 mN/m or less. As used herein, the "interface tension with respect to OPP" means the interface tension at 25° C. between an OPP film and a mixture of the organic compound (1 part by mass), 1,4-butanediol (9 parts by mass), and purified water (90 parts by mass) upon contact of the mixture with the OPP film, and can be calculated from the contact angle of the mixture to the OPP film using Young's equation. The OPP film to be used is, for example, PYLEN Film-OT (P2102) manufactured by Toyobo Co., Ltd.

The organic compound having an interface tension with respect to OPP of less than 20.7 mN/m has a property of being easily oriented to the interface between the ink and the printing medium after the ink lands on the printing medium. It is considered that this property lowers the interface tension generated at the interface between the ink and the printing medium and promotes the wetting and spreading of the ink on the printing medium, resulting in excellent wettability.

The organic compound preferably contains at least one selected from the group consisting of polyoxyalkylene alkyl ether, polyoxyalkylene aryl ether, polyoxyethylene alkyl sulfate, and an acetylene glycol surfactant, and more preferably contains at least one selected from the group consisting of polyoxyethylene naphthyl ether, polyoxyalkylen-2-ethylhexyl ether, polyoxyethylene lauryl sulfate, and an acetylene glycol surfactant.

Specific examples of the polyoxyalkylene alkyl ether include polyoxyalkylene-2-ethylhexyl ether, and commercially available products thereof include TERGITOL EH3 (manufactured by The Dow Chemical Company). Other specific examples of the polyoxyalkylene alkyl ether include polyoxyalkylene C12/C15 alkyl ether, and commercially available products thereof include GENAPOL EP2544 (manufactured by Clariant (Japan) K.K.).

Specific examples of the polyoxyalkylene aryl ether include polyoxyethylene β-naphthyl ether, and commercially available products thereof include BLAUNON BN-3, BN-10, and BN-25 (manufactured by AOKI OIL INDUSTRIAL Co., Ltd.).

Specific examples of the polyoxyethylene alkyl sulfate include polyoxyethylene lauryl ether ammonium sulfate, and commercially available products thereof include HITENOL LA-10, LA-12, and LA-16 (manufactured by DKS Co. Ltd.).

Specific examples of the acetylene glycol surfactant include SURFYNOL 485 (manufactured by Evonik Industries AG).

Among them, BLAUNON BN-3 (polyoxyethylene β-naphthyl ether), TERGITOL EH3 (polyoxyalkylene glycol 2-ethylhexyl ether), HITENOL LA-10 (polyoxyethylene lauryl ether ammonium sulfate), GENAPOL EP2544 (polyoxyalkylene C12/C15 alkyl ether), acetylene glycol surfactant (SURFYNOL 485), and the like are preferred.

The content of the organic compound with respect to the total mass of the ink according to the present embodiment is preferably 0.05 to 1.5% by mass, more preferably 0.10 to 1% by mass, and even more preferably 0.3 to 0.7% by mass, from the viewpoint of wettability to a non-ink-absorbent medium.

The value of (B)/(A) is 0.01 to 0.50, preferably 0.01 to 0.3, more preferably 0.05 to 0.2, and even more preferably 0.075 to 0.125 where (A) represents the total mass of the water-soluble organic solvent contained in the ink according to the present embodiment, and (B) represents the total mass of the organic compound.

[Water]

The ink according to the present embodiment may contain water. The water is preferably water with a small contained amount of impurities such as metal ions, i.e., ion-exchanged water, distilled water, or the like.

When the ink according to the present embodiment contains water, the content thereof with respect to the total mass of the ink according to the present embodiment is preferably 50 to 90% by mass, more preferably 60 to 90% by mass, and even more preferably 60 to 80% by mass.

[Surface-tension Modifier]

The ink according to the present embodiment preferably contains a surface-tension modifier excluding the organic compound above. In other words, it is preferable to use the organic compound in combination with a surface-tension modifier in the ink according to the present embodiment.

Examples of the surface-tension modifier include SURFYNOL 420 and 440 (manufactured by Evonik Industries AG), and SURFYNOL 440 is preferred.

SURFYNOL 420 and 440 are both a highly hydrophobic compound and have a property of being easily oriented to the ink surface (interface between ink and air) after the ink lands on a printing medium. It is considered that this property lowers the surface tension of the ink and promotes the wetting and spreading on the printing medium, resulting in excellent wettability even for a water-based ink.

When the ink according to the present embodiment contains the surface-tension modifier, the content thereof with respect to the total mass of the ink according to the present embodiment is preferably 0.3 to 10% by mass, more preferably 0.3 to 2% by mass, and even more preferably 0.3 to 1% by mass.

[Dispersant]

The ink according to the present embodiment may contain a dispersant. Examples of the dispersant include a copolymer composed of at least two monomers (preferably at least one of which is a hydrophilic monomer) selected from monomers such as styrene and a derivative thereof; vinylnaphthalene and a derivative thereof; an aliphatic alcohol ester of α,β-ethylene unsaturated carboxylic acids; (meth)acrylic acid and a derivative thereof; maleic acid and a derivative thereof; itaconic acid and a derivative thereof; fumaric acid and a derivative thereof; and vinyl acetate, vinyl alcohol, vinyl pyrrolidone, or acrylamide and a derivative thereof. The hydrophilic monomer includes a monomer in which a carboxyl group remains after polymerization, such as acrylic acid and methacrylic acid.

Examples of the copolymer include a styrene-(meth)acrylic acid copolymer, a styrene-(meth)acrylic acid-(meth)acrylic acid ester copolymer, a (meth)acrylic acid ester-(meth)acrylic acid copolymer, a polyethylene glycol (meth)acrylate-(meth)acrylic acid copolymer, and a styrene-maleic acid copolymer. Among them, a styrene-(meth)acrylic acid copolymer, a styrene-(meth)acrylic acid-(meth)acrylic acid ester copolymer, a (meth)acrylic acid ester-(meth)acrylic acid copolymer, and a polyethylene glycol (meth)acrylate-(meth)acrylic acid copolymer are preferred; a styrene-(meth)acrylic acid copolymer, a styrene-(meth)acrylic acid-(meth)acrylic acid ester copolymer, and a (meth)acrylic acid ester-(meth)acrylic acid copolymer are more preferred; and a (meth)acrylic acid ester-(meth)acrylic acid copolymer are even more preferred; and a methacrylic acid ester-methacrylic acid copolymer is particularly preferred. Examples of the copolymer include a block copolymer, a random copolymer, and a graft copolymer. The copolymer may be in the form of a salt.

As used herein, the term "(meth)acrylic" is used in a sense that includes both "acrylic" and "methacrylic". The same applies to "(meth)acrylate" and the like.

The dispersant can be synthesized or obtained as a commercially available product.

Examples of the dispersant obtained by synthesis include an A-B block polymer disclosed in International Publication No. WO 2013/115071. The monomer constituting an A block of the A-B block polymer disclosed in International Publication No. WO 2013/115071 is at least one monomer selected from (meth)acrylic acid and linear or branched C4 alkyl (meth)acrylate, preferably at least one monomer selected from methacrylic acid and n-butyl methacrylate, and more preferably a combination of these two monomers. In addition, the monomer constituting a B block of the A-B block polymer disclosed in International Publication No. WO 2013/115071 is at least one monomer selected from benzyl methacrylate and benzyl acrylate, preferably benzyl methacrylate. Specific examples of the A-B block polymer include block copolymers disclosed in Synthesis Examples 3 to 8 of International Publication No. WO 2013/115071.

Examples of the commercially available dispersant include Joncryl 62, 67, 68, 678, or 687 (styrene-acrylic copolymer manufactured by BASF SE); ARON AC-10SL (polyacrylic acid manufactured by Toagosei Co., Ltd.); and BYKJET 9151, 9152, 9170, or 9171 (wet dispersant manufactured by BYK).

The mass average molecular weight (MW) of the dispersant is preferably 3000 to 50000, and more preferably 7000 to 25000. The mass average molecular weight of the dispersant can be measured by gel permeation chromatography (GPC). Specifically, the measurement can be performed by using HLC-8320 GPC (manufactured by Tosoh Corporation) as a GPC device, two TSK gel Super MultIpore HZ—H (manufactured by Tosoh Corporation, inner diameter of 4.6 mm×15 cm) as columns, tetrahydrofuran as an eluent, and TSK Standard (manufactured by Tosoh Corporation) as a standard sample.

The acid value of the dispersant is preferably 50 to 300 mg KOH/g, more preferably 80 to 275 mg KOH/g, and even more preferably 80 to 250 mg KOH/g.

The dispersant can be used in a state of mixture with a pigment. In addition, the pigment may be used in a state where part or all of the surface thereof is covered with the dispersant. Alternatively, both of these states may be used together.

When the ink according to the present embodiment contains the dispersant, a ratio of the total mass of the dispersant to the total mass of the pigment is preferably 0.01 to 1.0, more preferably 0.05 to 0.6, and even more preferably 0.1 to 0.5.

[Fixing Resin]

The ink according to the present embodiment may contain a fixing resin. When the ink according to the present embodiment contains the fixing resin, an image printed on a printing medium tends to have improved fastness, such as water resistance, abrasion resistance, and alcohol resistance. The fixing resin is preferably at least one selected from a polymer and a wax.

The polymer is available commercially in the form of an emulsion. Examples of the commercially available polymer emulsion include Superflex 420, 470, and 890 (urethane resin emulsions, all manufactured by DKS Co. Ltd.); Hydran HW-350, HW-178, HW-163, HW-171, AP-20, AP-30, WLS-201, and WLS-210 (urethane resin emulsions, all manufactured by DIC Corporation); 0569, 0850Z, and 2108 (styrene-butadiene resin emulsions, all manufactured by JSR Corporation); AE980, AE981A, AE982, AE986B, and AE104 (acrylic resin emulsions, all manufactured by Emulsion Technology Co., Ltd.); and NeoCryl A-1105, A-1125, and A-1127 (acrylic resin emulsions, all manufactured by DSM Coating Resins Ltd.).

The wax available can be a natural wax and a synthetic wax.

Examples of the natural wax include a petroleum wax such as paraffin wax and microcrystalline wax; a lignite wax such as montane wax; a vegetable wax such as carnauba wax and candelilla wax; and an animal and plant wax such as beeswax and lanolin.

Examples of the synthetic wax include a polyalkylene wax (preferably, a poly-C2-C4 alkylene wax), an oxidized polyalkylene wax (preferably, an oxidized poly-C2-C4 alkylene wax), and a paraffin wax. Among them, a polyethylene wax, a polypropylene wax, an oxidized polyethylene wax, an oxidized polypropylene wax, and a paraffin wax are preferred.

The average particle size of the wax is preferably 50 nm to 5 μm, and more preferably 100 nm to 1 μm in order to prevent clogging of an inkjet head.

The wax is available commercially in the form of an emulsion. Examples of the commercially available wax emulsion include CERAFLOUR 925, 929, 950, and 991, AQUACER 498, 515, 526, 531, 537, 539, 552, and 1547, and AQUAMAT 208, 263, and 272; MINERPOL 221 (all manufactured by BYK); Mitsui Hi-WAX NL100, NL200, NL500, 4202E, 1105A, 2203A, NP550, NP055, and NP505 (all manufactured by Mitsui Chemicals, Inc.); KUE-100 and 11 (all manufactured by Sanyo Chemical Industrial, Co., Ltd.); and HYTEC P-5300, E-6500, 9015, and 6400 (all manufactured by Toho Chemical Industry, Co., Ltd.).

When the ink according to the present embodiment contains a fixing resin, the content thereof with respect to the total mass of the ink according to the present embodiment is preferably 1 to 20% by mass and more preferably 3 to 15% by mass. When the content of the fixing resin is 1% by mass or more, the ink tends to exhibit good fixing properties to a printing medium. When the content of the fixing resin is 20% by mass or less, the ink tends to have good discharge properties and storage stability.

[Other Components]

The ink according to the present embodiment may contain an ink preparation agent such as a fungicide, a preservative, a pH adjuster, a chelating reagent, a rust inhibitor, a defoamer, a water-soluble ultraviolet absorber, and an antioxidant, if necessary. The contained amount of each ink preparation agent can be arbitrarily set according to the application of the ink and the like.

(Fungicide)

Examples of the fungicide include sodium dehydroacetate, sodium benzoate, sodium pyridinethion-1-oxide, p-hydroxybenzoic acid ethyl ester, and 1,2-benzisothiazolin-3-one and a salt thereof.

(Preservative)

Examples of the preservative include an organic sulfur compound, an organic nitrogen sulfur compound, an organic halogen compound, a haloarylsulfone compound, an iodopropargyl compound, a haloalkylthio compound, a nitrile compound, a pyridine compound, an 8-oxyquinoline compound, a benzothiazole compound, an isothiazoline compound, a dithiol compound, a pyridine oxide compound, a nitropropane compound, an organotin compound, a phenol compound, a quaternary ammonium salt compound, a triazine compound, a thiazine compound, an anilide compound, an adamantane compound, a dithiocarbamate compound, a brominated indanone compound, a benzyl bromoacetate compound, and an inorganic salt compound. Specific examples of the organic halogen compound include sodium pentachlorophenol. Specific examples of the pyridine oxide compound include sodium 2-pyridinethiol-1-oxide. Specific examples of the isothiazoline compound include 1,2-benzisothiazolin-3-one, 2-n-octyl-4-isothiazolin-3-one, 5-chloro-2-methyl-4-isothiazolin-3-one, 5-chloro-2-methyl-4-isothiazolin-3-one magnesium chloride, 5-chloro-2-methyl-4-isothiazolin-3-one calcium chloride, and 2-methyl-4-isothiazolin-3-one calcium chloride. Specific examples of the other preservative and fungicide include anhydrous sodium acetate, sodium sorbate, sodium benzoate, and trade names Proxel GXL (S), Proxel LV, and Proxel XL-2 (S), manufactured by Arch Chemicals Inc.

(pH Adjuster)

Examples of the pH adjuster include alkanolamine such as diethanolamine, triethanolamine, and N-methyldiethanolamine; a hydroxide of an alkali metal such as lithium hydroxide, sodium hydroxide, and potassium hydroxide; ammonium hydroxide (aqueous ammonia); a carbonate of an alkali metal such as lithium carbonate, sodium carbonate, sodium bicarbonate, and potassium carbonate; an alkali metal salt of an organic acid such as sodium silicate and potassium acetate; and an inorganic base such as disodium phosphate.

(Chelating Reagent)

Examples of the chelating reagent include disodium ethylenediaminetetraacetate, sodium nitrilotriacetate, sodium hydroxyethylethylenediaminetriacetate, sodium diethylenetriaminepentaacetate, and sodium uracil diacetate.

(Rust Inhibitor)

Examples of the rust inhibitor include acid sulfite, sodium thiosulfate, ammonium thioglycolate, diisopropylammonium nitrite, pentaerythritol tetranitrate, and dicyclohexylammonium nitrite.

(Defoamer)

Examples of the defoamer include a silica mineral oil compound, an olefin compound, and an acetylene compound. Examples of the commercially available defoamer include SURFYNOL DF37, DF58, DF110D, DF220, and MD-20, and Olfine SK-14, manufactured by Shin-Etsu Chemical Co., Ltd.

(Water-soluble Ultraviolet Absorber)

Examples of the water-soluble ultraviolet absorber include a sulfonated benzophenone compound, a benzotriazol compound, a salicylic acid compound, a cinnamic acid compound, and a triazine compound.

(Antioxidant)

The antioxidant available can be various organic and metal complex antifading agents. Examples of the organic antifading agents include hydroquinones, alkoxyphenols, dialkoxyphenols, phenols, anilines, amines, indanes, chromanes, alkoxyanilines, and heterocycles.

[Ink Preparation Method]

The method of preparing the ink according to the present embodiment is not particularly limited, and any known preparation method can be employed. One example thereof is a method of preparing an aqueous dispersion liquid containing a pigment and a dispersant, adding a water-soluble organic solvent, an organic compound, and if necessary, an ink preparation agent, to this dispersion liquid, and mixing it.

Examples of the method of preparing the dispersion liquid include a phase inversion emulsification method, an acid precipitation method, an interfacial polymerization method, an in-situ polymerization method, a submerged curing coating method, a coacervation (phase separation) method, a submerged drying method, a melt-dispersion cooling method, an in-air suspension coating method, and a spray drying method. Among them, the phase inversion emulsification method, the acid precipitation method, and the interfacial polymerization method are preferred, and the phase inversion emulsification method is more preferred.

When the dispersion liquid is prepared by the phase inversion emulsification method, for example, the dispersant is dissolved in an organic solvent such as 2-butanone, and an aqueous solution of a neutralizer is added to prepare an emulsified liquid. A pigment is added to the resulting emulsified liquid for dispersion treatment. From the liquid thus obtained, the organic solvent and part of the water can be distilled under reduced pressure, thereby obtaining the desired dispersion liquid.

The dispersion treatment can be carried out using a sand mill (bead mill), a roll mill, a ball mill, a paint shaker, an ultrasonic disperser, a microfluidizer, or the like. For example, when the sand mill is used, the dispersion treatment can be performed by using beads with a particle size of about 0.01 to 1 mm and by appropriately setting the packing ratio of the beads. By performing operations such as filtration and centrifugation on the dispersion liquid obtained as described above, the particle sizes of the particles contained in the dispersion liquid can be uniform. When foaming occurs during the preparation of the dispersion liquid, a known silicone or acetylene glycol defoamer can be added in an extremely small amount.

The ink according to the present embodiment preferably has a low content of inorganic impurities such as chloride of metal cations (e.g., sodium chloride) and metal sulfate (e.g., sodium sulfate). Such inorganic impurities are often present in a commercially available pigment. The standard content of the inorganic impurities is approximately 1% by mass or less with respect to the total mass of the pigment, and the lower limit is below the detection limit of the analyzer, i.e., 0% by mass is ideal. Examples of the method of obtaining a pigment with few inorganic impurities include a method using a reverse osmosis membrane; a method of suspending and stirring a solid pigment in a mixed solvent of C1-C4 alcohol such as methanol and water and separating the pigment through filtration, followed by drying; and a method of exchanging and adsorbing inorganic impurities with an ion exchange resin.

The ink according to the present embodiment is preferably microfiltered in advance. A membrane filter, glass filter paper, or the like can be used for microfiltration. The pore size of the filter or the like when performing microfiltration is usually 0.5 to 20 μm, preferably 0.5 to 10 μm.

The ink according to the present embodiment is also excellent in storage stability, redispersibility, color development, and chroma. An image recorded using the ink according to the present embodiment is also excellent in various fastness, such as water resistance, light resistance, and heat resistance. In addition, the ink according to the present embodiment has little coating unevenness during image formation and is also excellent in image formability.

<Ink Set and Ink and Medium Set>

The ink set according to the present embodiment includes the above-described ink according to the present embodiment and an additional ink different from the ink. The additional ink is not particularly limited as long as it has a configuration different from that of the ink according to the present embodiment but preferably has a hue different from that of the ink according to the present embodiment.

In addition, the ink and medium set according to the present embodiment includes the above-described ink or ink set according to the present embodiment and a printing medium.

The printing medium is not particularly limited but preferably a less ink-absorbent or non-ink-absorbent printing medium, and more preferably a non-ink-absorbent printing medium. Examples of the less ink-absorbent printing medium include plain paper without an ink-receiving layer, a medium used in rotogravure or offset printing, art paper, coated paper, matte paper, and cast paper. Further, examples of the non-ink-absorbent printing medium include a polyethylene terephthalate (PET) film, a polypropylene (PP) film, a vinyl chloride sheet, glass, and rubber.

<Inkjet Printing Method>

The inkjet printing method according to the present embodiment is a method of performing printing by discharging droplets of the above-described ink according to the present embodiment in response to a printing signal and adhering the droplets to a printing medium. The ink nozzle and the like of the inkjet printer that discharges ink are not particularly limited and can be appropriately selected according to the purpose.

The inkjet printing method according to the present embodiment also includes a method of improving resolution of an image by ejecting a large number of inks with a low content of pigments in the inks in a small volume; a method of improving resolution of an image by using a plurality of inks having substantially the same hue but different contents of pigments in the inks; and a method of improving fixing properties of a pigment to a printing medium by using a colorless transparent ink together with an ink containing the pigment.

As the inkjet printing method, a known method can be employed. Examples thereof include a charge control method, a drop-on-demand method (also referred to as a pressure pulse method), an acoustic inkjet method, and a thermal inkjet method. Furthermore, the inkjet printing method may be either a multi-pass method or a single-pass method (one pass printing method). In an industrial inkjet printer, single-pass printing using a line-head type inkjet printer is also preferably performed for the purpose of increasing the printing speed.

When printing on a printing medium, for example, a container (ink tank) containing an ink is loaded into a predetermined position of an inkjet printer, and printing is performed on the printing medium by the printing method described above. Full-color printing can also be achieved by loading a container containing each color ink into a predetermined position of an inkjet printer and printing on a printing medium by the printing method described above.

When a printing medium without an ink-receiving layer is used, surface modification treatment is also preferably performed on the printing medium to improve fixing properties or the like of a coloring material. Examples of the surface modification treatment include corona discharge treatment, plasma treatment, and flame treatment. It is generally known that the effect of the surface modification treatment decreases over time. Therefore, it is preferable to sequentially perform the surface modification treatment step and the inkjet printing step, and it is more preferable to perform the surface modification treatment step right before the inkjet printing step.

For all of the above, combinations of preferred ones are more preferred, and combinations of more preferred ones are even more preferred. The same is true for combinations of preferred and more preferred, combinations of more preferred and even more preferred, and the like.

EXAMPLES

Hereinafter, the present invention will be described in more detail with reference to Examples, but the present invention is not limited thereto.

In Examples, "part" and "%" mean part by mass and % by mass, respectively, unless otherwise specified. When it was necessary to quantify pigment solids in a dispersion liquid, a dry weight method was employed with MS-70 manufactured by A&D Company, Limited. The pigment solids are conversion values obtained by calculating only the pigment solids from the total amount of the solid content.

Preparation Example 1: Preparation of Pigment Dispersion Liquid DP1

Synthesis Example 3 in International Publication No. WO 2013/115071 was replicated to obtain a block copolymer. The obtained block copolymer had an acid value of 105 mg KOH/g and a mass average molecular weight of 25000. The obtained block copolymer (6 parts) was dissolved in 2-butanone (30 parts) to form a homogeneous solution. A 28% aqueous ammonia solution (0.68 parts) dissolved in ion-exchanged water (53 parts) was added to this liquid, and the mixture was stirred for an hour to obtain an emulsified liquid. C.I. Pigment Blue 15:4 (Chromofine Blue 4851, manufactured by Dainichiseika Color & Chemicals Mfg. Co., Ltd.) (20 parts) was added to the emulsified liquid, and the mixture was subjected to a dispersion treatment in a sand grinder under a condition of 1500 rpm for 15 hours. Ion-exchanged water (100 parts) was added dropwise to the resulting liquid, and dispersing beads were removed from the mixture by filtration. Then, 2-butanone and part of the water were distilled under reduced pressure with an evaporator to obtain a pigment dispersion liquid with 12% pigment solids. The obtained pigment dispersion liquid was referred to as "DP1".

Preparation Example 2: Preparation of Pigment Dispersion Liquid DP2

BYKJET 9151 (manufactured by BYK) (8 parts) was dissolved in ion-exchanged water (72 parts) and stirred for an hour. C.I. Pigment Blue 15:4 (Chromofine Blue 4851, manufactured by Dainichiseika Color & Chemicals Mfg. Co., Ltd.) (20 parts) was added to the resulting solution, and the mixture was subjected to a dispersion treatment in a sand grinder under a condition of 1500 rpm for 15 hours. Ion-exchanged water (70 parts) was added dropwise to the resulting liquid, and dispersing beads were removed from the mixture by filtration to obtain a pigment dispersion liquid with 11.6% pigment solids. The obtained pigment dispersion liquid was referred to as "DP2".

Preparation Example 3: Preparation of Pigment Dispersion Liquid DP3

Joncryl 68 (manufactured by BASF SE, mass average molecular weight: 13000) (9 parts) and triethanolamine (6 parts) were dissolved in ion-exchanged water (75 parts) and stirred for an hour. C.I. Pigment Blue 15:4 (Chromofine Blue 4851, manufactured by Dainichiseika Color & Chemicals Mfg. Co., Ltd.) (30 parts) was added to the resulting solution, and the mixture was subjected to a dispersion treatment in a sand grinder under a condition of 1500 rpm for 15 hours. Ion-exchanged water (40 parts) was added dropwise to the resulting liquid, and dispersing beads were removed from the mixture by filtration to obtain a pigment dispersion liquid with 18.7% pigment solids. The obtained pigment dispersion liquid was referred to as "DP3".

<Examples 1 to 13 and Comparative Examples 1 to 5>

Components listed in Tables 1 to 3 below were mixed together and then filtered through a membrane filter having a pore size of 3 μm to obtain inks of Examples 1 to 13 and Comparative Examples 1 to 5. The numerical values in the columns of each component in Tables 1 to 3 represent the amount (parts) of the component used, and "-" means that the component was not used. In addition, "-" in the column of the surface tension in Table 3 means that the surface tension could not be measured due to incompatibility of the ink.

Each abbreviation or the like in Tables 1 to 3 below is as follows.

Dp1: pigment dispersion liquid obtained in Preparation Example 1

Dp2: pigment dispersion liquid obtained in Preparation Example 2

CABOJET: CAB-O-JET 400 (self-dispersing black pigment liquid, manufactured by Cabot Corporation, pigment solids: 15.1%)

Dp3: pigment dispersion liquid obtained in Preparation Example 3

15PD: 1,5-pentanediol (manufactured by Tokyo Chemical Industry Co., Ltd, boiling point: 242° C., log P value: −0.635, interface tension with respect to OPP: 24.3 mN/m)

14BD: 1,4-butanediol (manufactured by Tokyo Chemical Industry Co., Ltd., boiling point: 230° C., log P value: −1.164, interface tension with respect to OPP: 30.7 mN/m)

3 MB: 3-methoxy-1-butanol (manufactured by Tokyo Chemical Industry Co., Ltd., boiling point: 158° C., log P value: 0.024, interface tension with respect to OPP: 42.0 mN/m)

PNP: propylene glycol n-propyl ether (manufactured by The Dow Chemical Company, boiling point: 149° C., log P value: 0.710, interface tension with respect to OPP: 36.0 mN/m)

DEGBM: diethylene glycol butylmethyl ether (manufactured by Tokyo Chemical Industry Co., Ltd., boiling point: 212° C., log P value: 1.188, interface tension with respect to OPP: 23.9 mN/m)

2EtHex13OH: 2-ethylhexane-1,3-diol (manufactured by Tokyo Chemical Industry Co., Ltd, boiling point: 244° C., log P value: 1.258, interface tension with respect to OPP: 17.1 mN/m)

BN3: BLAUNON BN-3 (polyoxyethylene (-naphthyl ether, manufactured by AOKI OIL INDUSTRIAL Co., Ltd, interface tension with respect to OPP: 7.4 mN/m)

EH3: TERGITOL EH3 (polyoxyalkylene glycol 2-ethylhexyl ether, manufactured by The Dow Chemical Company, interface tension with respect to OPP: 14.8 mN/m)

LA10: HITENOL LA-10 (polyoxyethylene lauryl ether ammonium sulfate, interface tension with respect to OPP: 14.3 mN/m)

EP2544: GENAPOL EP2544 (polyoxyalkylene C12/C15 alcohol, manufactured by Clariant (Japan) K.K., interface tension with respect to OPP: 14.3 mN/m)

Sf485: SURFYNOL 485 (acetylenediol (C10) ethylene oxide adduct, manufactured by Evonik Industries AG, interface tension with respect to OPP: 17.2 mN/m)

OD25: EMALEX OD-25 (polyoxyethylene octyldodecyl ether, manufactured by Nihon Emulsion Co., Ltd., interface tension with respect to OBB: 20.7 mN/in)

Sf440: SURFYNOL 440 (acetylenediol (C10) ethylene oxide adduct, manufactured by Evonik Industries AG)

TABLE 1

| Component | | Example 1 | 2 | 3 | 4 | 5 | 6 | 7 |
|---|---|---|---|---|---|---|---|---|
| Pigment | DP1 | 26.72 | 26.72 | 26.72 | 26.72 | 26.72 | 26.72 | 26.72 |
| | DP2 | — | — | — | — | — | — | — |
| | CABOJET | — | — | — | — | — | — | — |
| | DP3 | — | — | — | — | — | — | — |
| Water-soluble organic solvent | 15PD | 5.00 | 5.00 | 5.00 | 5.00 | 5.00 | — | — |
| | 14BD | — | — | — | — | — | 5.00 | — |
| | 3MB | — | — | — | — | — | — | 5.00 |
| | PnP | — | — | — | — | — | — | — |
| | DEGBM | — | — | — | — | — | — | — |
| | 2EtHex13OH | — | — | — | — | — | — | — |
| Organic compound | BN3 | 0.50 | — | — | — | — | 0.50 | 0.50 |
| | EH3 | — | 0.50 | — | — | — | — | — |
| | LA10 | — | — | 0.50 | — | — | — | — |
| | EP2544 | — | — | — | 0.50 | — | — | — |
| | Sf485 | — | — | — | — | 0.50 | — | — |
| | OD25 | — | — | — | — | — | — | — |
| Surface-tension modifier | Sf440 | 0.50 | 0.50 | 0.50 | 0.50 | 0.50 | 0.50 | 0.50 |
| | Water | 67.28 | 67.28 | 67.28 | 67.28 | 67.28 | 67.28 | 67.28 |
| Total | | 100.0 | 100.0 | 100.0 | 100.0 | 100.0 | 100.0 | 100.0 |
| Surface tension [mN/m] | | 31.9 | 32.2 | 31.2 | 30.1 | 31.0 | 31.6 | 31.5 |

TABLE 2

| Component | | Example 8 | 9 | 10 | 11 | 12 | 13 |
|---|---|---|---|---|---|---|---|
| Pigment | DP1 | 26.72 | 26.72 | 26.72 | — | — | — |
| | DP2 | — | — | — | 30.17 | — | — |
| | CABOJET | — | — | — | — | 23.18 | — |
| | DP3 | — | — | — | — | — | 18.72 |
| Water-soluble organic solvent | 15PD | — | — | 5.00 | 5.00 | 5.00 | 5.00 |
| | 14BD | — | — | — | — | — | — |
| | 3MB | — | — | — | — | — | — |
| | PnP | 5.00 | — | — | — | — | — |
| | DEGBM | — | 5.00 | — | — | — | — |
| | 2EtHex13OH | — | — | — | — | — | — |
| Organic compound | BN3 | 0.50 | 0.50 | 0.50 | 0.50 | 0.50 | 0.50 |
| | EH3 | — | — | — | — | — | — |
| | LA10 | — | — | — | — | — | — |
| | EP2544 | — | — | — | — | — | — |
| | Sf485 | — | — | — | — | — | — |
| | OD25 | — | — | — | — | — | — |
| Surface-tension modifier | Sf440 | 0.50 | 0.50 | 0.40 | 0.50 | 0.50 | 0.50 |
| | Water | 67.28 | 67.28 | 67.38 | 63.83 | 70.82 | 75.28 |
| Total | | 100.0 | 100.0 | 100.0 | 100.0 | 100.0 | 100.0 |
| Surface tension [mN/m] | | 30.1 | 29.0 | 32.8 | 27.6 | 29.2 | 31.4 |

TABLE 3

| Component | | Comparative Example 1 | 2 | 3 | 4 | 5 |
|---|---|---|---|---|---|---|
| Pigment | DP1 | 26.72 | 26.72 | 26.72 | 26.72 | 26.72 |
| | DP2 | — | — | — | — | — |
| | CABOJET | — | — | — | — | — |
| | DP3 | — | — | — | — | — |
| Water-soluble organic solvent | 15PD | 5.00 | — | 5.00 | 5.00 | 5.00 |
| | 14BD | — | — | — | — | — |
| | 3MB | — | — | — | — | — |
| | PnP | — | — | — | — | — |
| | DEGBM | — | — | — | — | — |
| | 2EtHex13OH | — | 5.00 | — | — | — |
| Organic compound | BN3 | — | 0.50 | — | 0.50 | 0.50 |
| | EH3 | — | — | — | — | — |
| | LA10 | — | — | — | — | — |
| | EP2544 | | — | — | — | — |
| | Sf485 | — | — | — | — | — |
| | OD25 | — | — | 0.50 | — | — |
| Surface-tension modifier | Sf440 | 0.50 | 0.50 | 0.50 | 0.30 | 0.20 |
| | Water | 67.78 | 67.28 | 67.28 | 67.48 | 67.58 |
| | Total | 100.0 | 100.0 | 100.0 | 100.0 | 100.0 |
| | Surface tension [mN/m] | 31.0 | — | 30.6 | 33.7 | 35.0 |

<Evaluation>

[Evaluation of Compatibility]

30 parts of the inks of Examples 1 to 13 and Comparative Examples 1 to 5 were each sealed in a 50-mL LABORAN screw tube bottle (model No.: 9-852-09, manufactured by AS ONE Corporation) and allowed to stand at room temperature for 12 hours or more. Thereafter, the inks were visually checked to evaluate compatibility according to evaluation criteria below. The results are shown in Tables 4 and 5 below.

—Criteria for Evaluation of Compatibility—

A: Homogeneous and completely mixed

B: No oil droplets on the liquid surface, but suspended and not completely dissolved C: Oil droplets being floating on the surface of the ink and not completely dissolved D: Components in the ink being separated and not dissolved at all

[Measurement of Contact Angle]

An OPP film (PYLEN Film-OT (P2102), manufactured by Toyobo Co., Ltd.) was used as a substrate to measure a contact angle between each of the inks obtained above and the OPP film, and the evaluation was made according to evaluation criteria below. Specifically, DM-501 Hi (manufactured by Kyowa Interface Science Co., Ltd.) was used as a contact angle meter to measure a contact angle at 25° C. 10 seconds after ink landing with a droplet amount of 2 μL. The results are shown in Tables 4 and 5 below. In Table 5, "-" indicates that the ink material was not mixed, and thus evaluation of the ink was impossible.

—Criteria for Evaluation of Contact Angle—

A: Contact angle≤18°

B: 18°<contact angle≤21°

C: 21°<contact angle≤23°

B: 23°<contact angle

TABLE 4

| | Example 1 | 2 | 3 | 4 | 5 | 6 | 7 | 8 | 9 | 10 | 11 | 12 | 13 |
|---|---|---|---|---|---|---|---|---|---|---|---|---|---|
| Compatibility | A | A | A | A | A | A | A | A | A | A | A | A | A |
| Evaluation Result of Contact Angle | A | A | A | A | A | A | A | A | A | A | A | A | A |
| Contact angle [degree] | 11 | 12 | 17 | 15 | 11 | 8 | 9 | 7 | 13 | 14 | 17 | 7 | 14 |

TABLE 5

| | Comparative Example 1 | 2 | 3 | 4 | 5 |
|---|---|---|---|---|---|
| Compatibility | A | D | A | A | A |
| Evaluation Result of Contact Angle | D | — | C | D | D |
| Contact angle [degree] | 24 | — | 22 | 27 | 36 |

As shown in Tables 4 and 5 above, the inks of Examples 1 to 13 were superior to the inks of Comparative Examples 1 to 5 in terms of wettability to the OPP film and were equivalent to or better than the inks of Comparative Examples 1 to 5 in terms of compatibility. The results indicate that the inks of Examples 1 to 13 are excellent inks having both wettability and compatibility.

The invention claimed is:

1. An inkjet ink comprising a pigment, a water-soluble organic solvent, and an organic compound excluding the pigment and the water-soluble organic solvent, wherein a logP value of the water-soluble organic solvent is less than 1.258;

an interface tension of the organic compound with respect to biaxially oriented polypropylene (OPP) is less than 20.7 mN/m, where the interface tension at 25° C. between an OPP film and a mixture of 1 part by mass of the organic compound, 9 parts by mass of 1,4-butanediol, and 90 parts by mass of purified water, as determined by contacting the mixture with the OPP film, is defined as the interface tension of the organic compound with respect to OPP;

a value of (B)/(A) is 0.01 to 0.50, where (A) represents a total mass of the water-soluble organic solvent contained in the inkjet ink, and (B) represents a total mass of the organic compound; and the inkjet ink has a surface tension of less than 33.7 mN/m at 25° C.

2. The inkjet ink according to claim 1, wherein the interface tension of the organic compound with respect to OPP is 19 mN/m or less.

3. The inkjet ink according to claim 1, wherein the interface tension of the organic compound with respect to OPP is 18 mN/m or less.

4. The inkjet ink according to claim 1, wherein the water-soluble organic solvent comprises at least one selected from the group consisting of a compound represented by formula (1) below, a compound represented by formula (2) below, propylene glycol alkyl ether, and diethylene glycol alkyl ether:

$$HO—R^1—OH \quad (1)$$

wherein $R^1$ represents a linear or branched C4-C6 hydrocarbon group, and

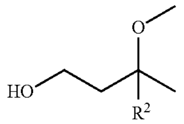

(2)

wherein $R^2$ represents a hydrogen atom or a methyl group.

5. The inkjet ink according to claim 4, wherein the water-soluble organic solvent comprises at least one selected from the group consisting of 1,5-pentanediol, 1,4-butanediol, 1,6-hexanediol, propylene glycol monopropyl ether, diethylene glycol alkyl ether, and 3-methoxy-1-butanol.

6. The inkjet ink according to claim 1, wherein the organic compound comprises at least one selected from the group consisting of polyoxyalkylene alkyl ether, polyoxyalkylene aryl ether, polyoxyethylene alkyl sulfate, and an acetylene glycol surfactant.

7. The inkjet ink according to claim 6, wherein the organic compound comprises at least one selected from the group consisting of polyoxyethylene naphthyl ether, polyoxyalkylene-2-ethylhexyl ether, polyoxyethylene lauryl sulfate, and an acetylene glycol surfactant.

8. An ink set comprising: the inkjet ink according to claim 1; and an additional inkjet ink different from the inkjet ink.

9. An ink and medium set comprising: the inkjet ink according to claim 1 and a printing medium.

10. A printed medium to which the inkjet ink according to claim 1 has adhered.

* * * * *